June 4, 1963 R. C. MILEK 3,092,264
PORTABLE MATERIAL HANDLING APPARATUS
Filed Dec. 9, 1959 5 Sheets-Sheet 5

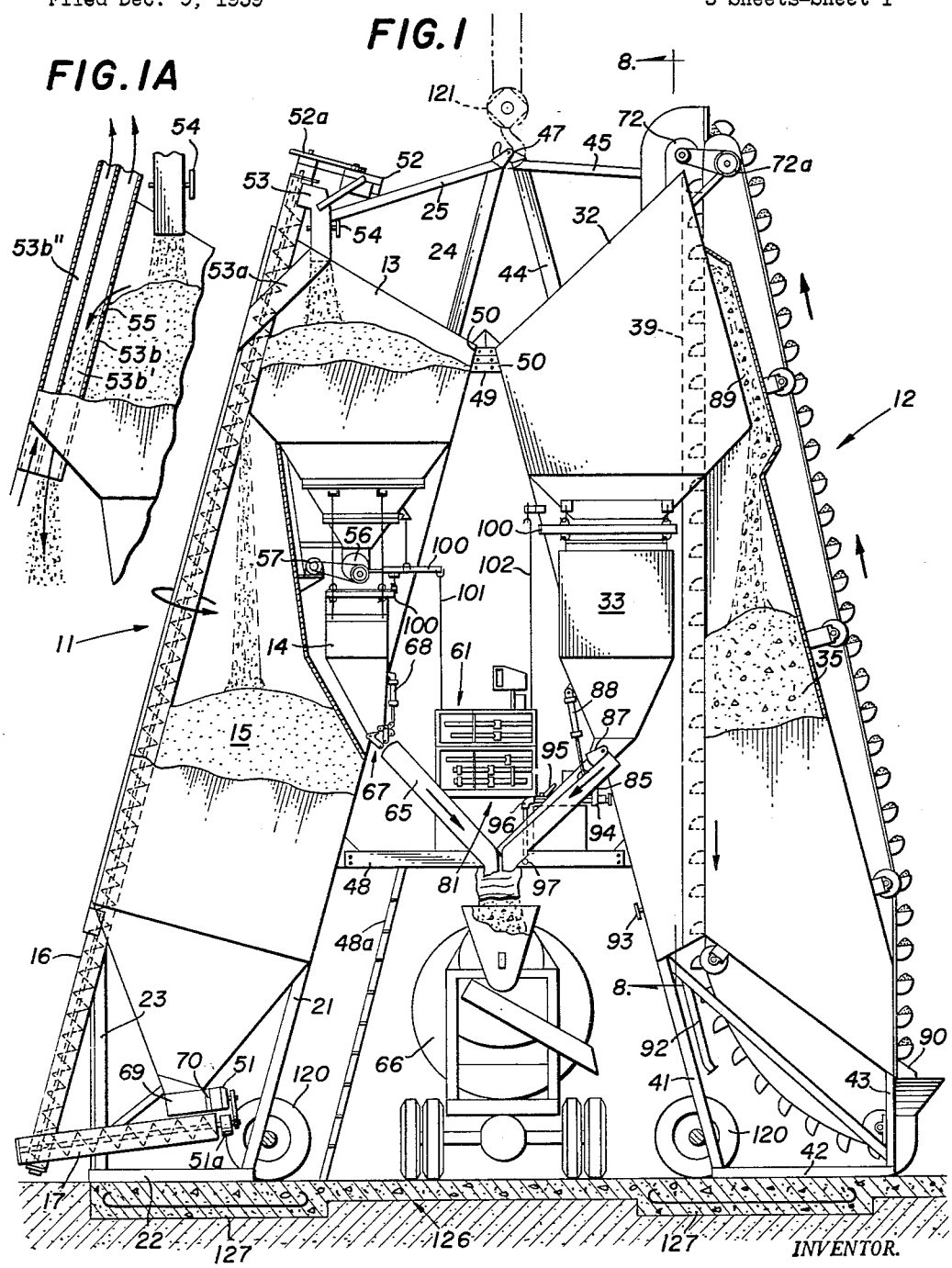

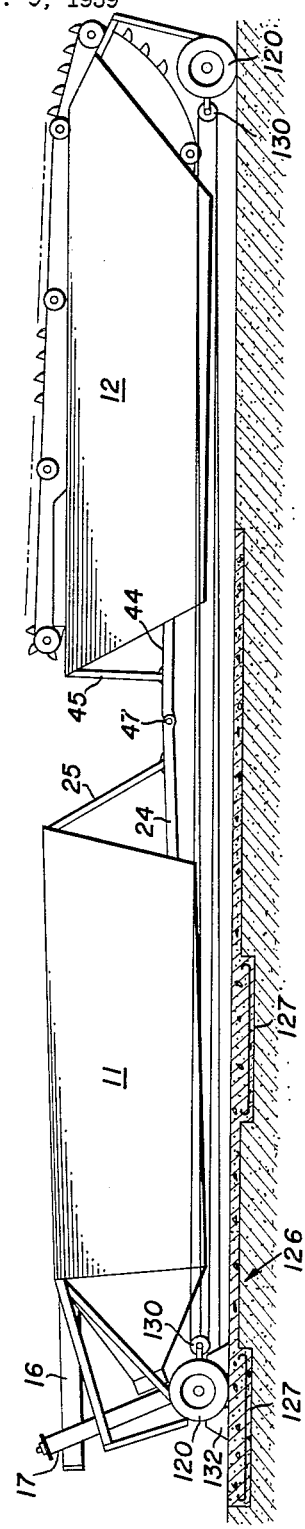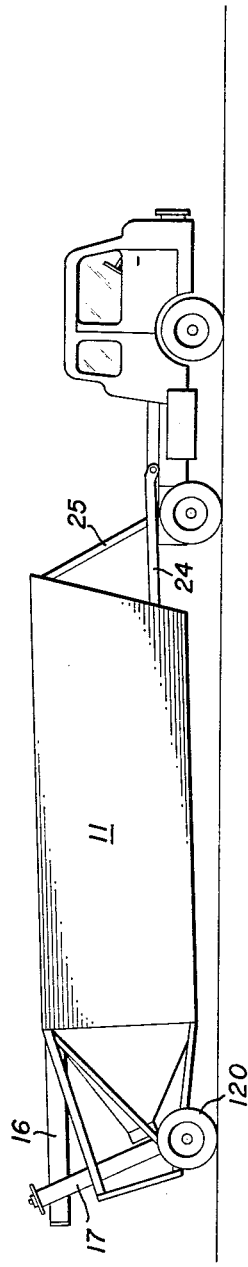

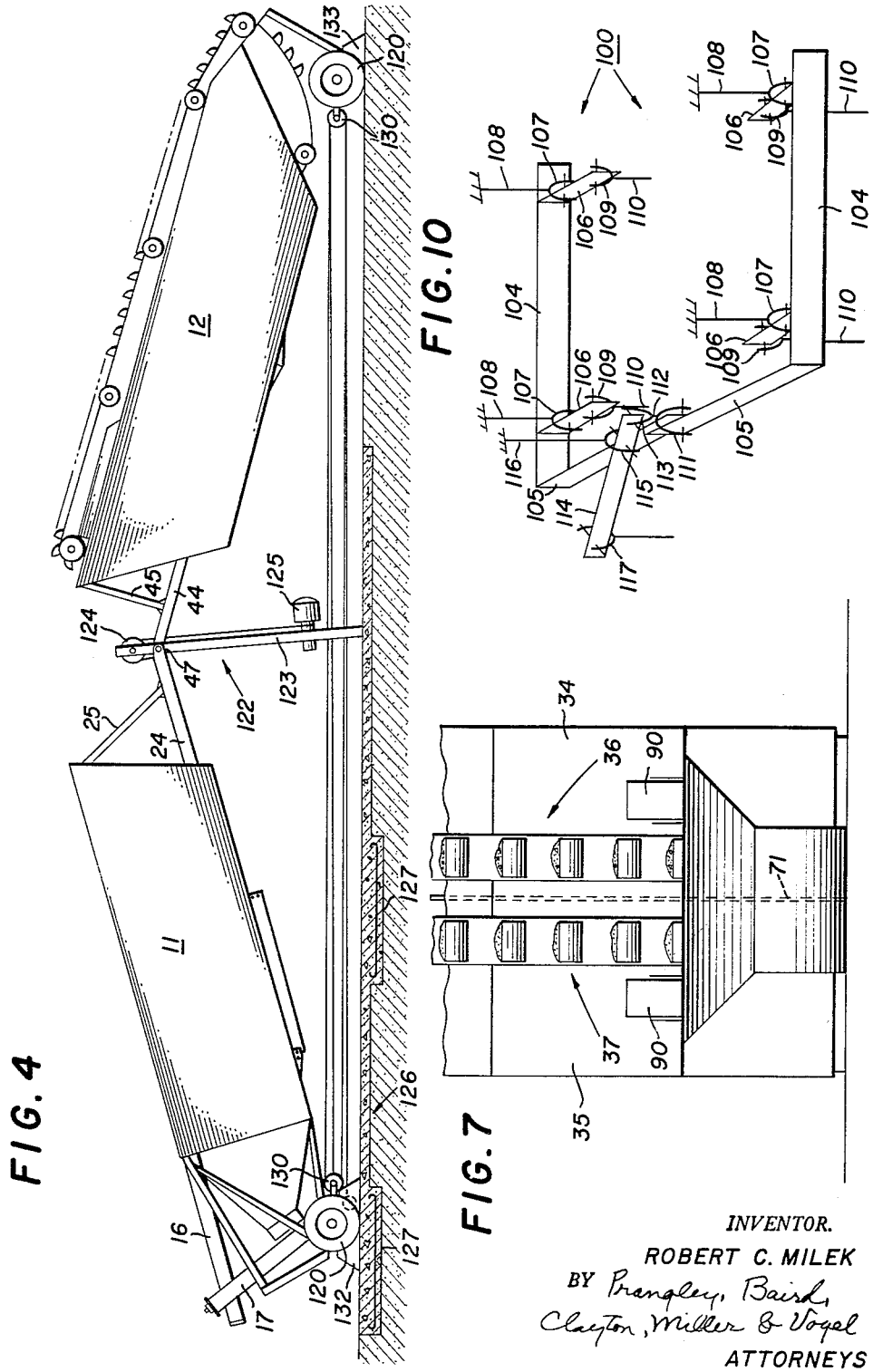

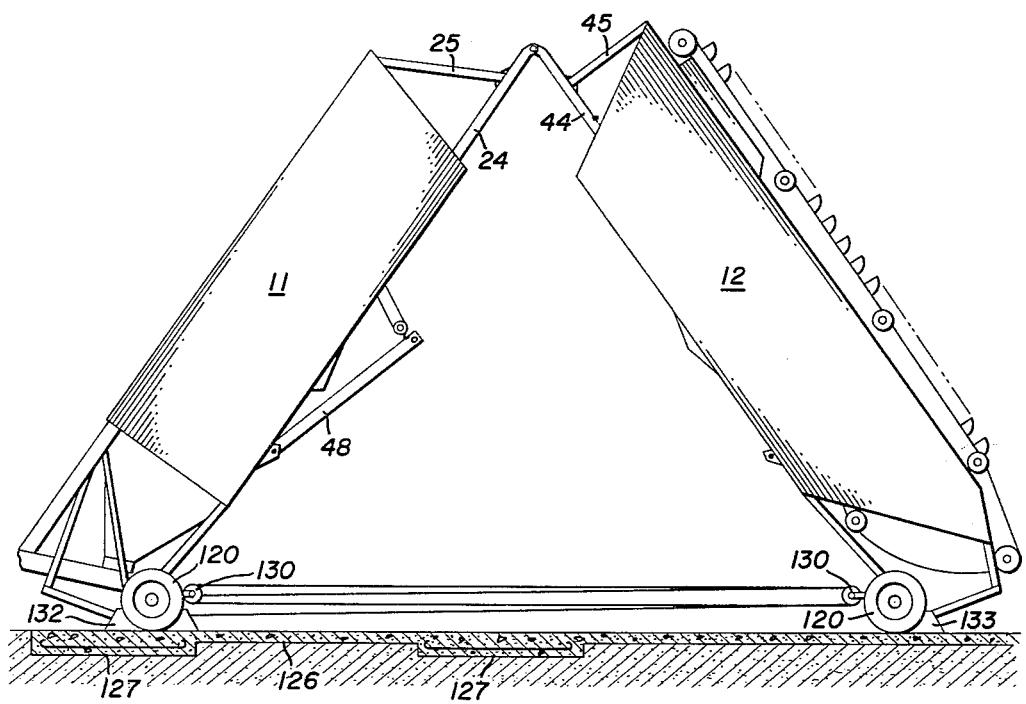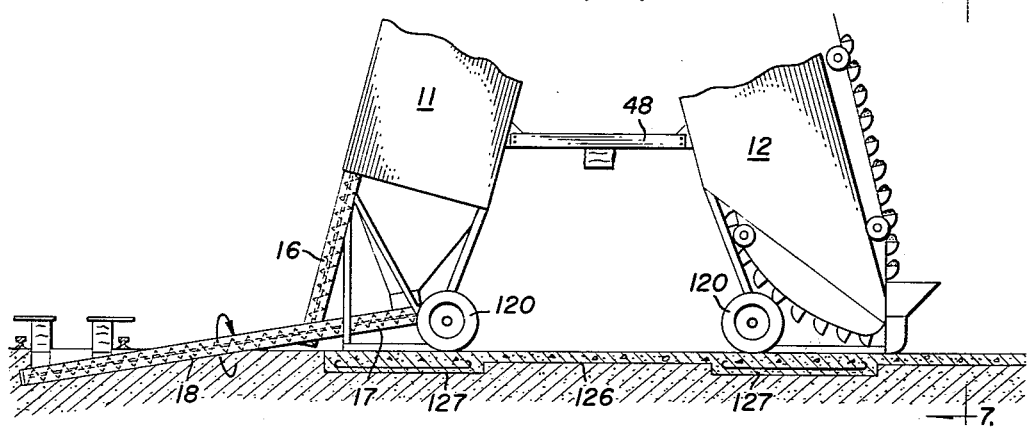

INVENTOR.
ROBERT C. MILEK
BY Prangley, Baird,
Clayton, Miller & Vogel
ATTORNEYS

United States Patent Office 3,092,264
Patented June 4, 1963

3,092,264
PORTABLE MATERIAL HANDLING APPARATUS
Robert C. Milek, 5502 N. 50th Ave., Omaha, Nebr.
Filed Dec. 9, 1959, Ser. No. 858,485
5 Claims. (Cl. 214—2)

This invention relates to material handling apparatus and, more particularly, to transportable handling apparatus for use in preparing batches of dried materials by weight for subsequent discharge thereof from the apparatus and into utilization devices such as a mixer. An exemplary utility for the apparatus is that of preparing the cement binder and aggregate materials for making concrete.

Referring in greater detail to the making of concrete as an environmental setting for the invention, the present practice in many instances is to charge a truck mixer at a permanent or stationary material handling plant and to then transport the mixer to the location of use which may be a substantial distance from the plant. Another arrangement is to locate truck mixers at the point of use and to haul cement and aggregates in large quantities to such location and, as a consequence, the cement and the aggregates must be rehandled for batching and charging the mixers. Both of these arrangements have disadvantages and the material handling apparatus of the present invention is readily transportable so that it may be moved whenever necessary to a location that is both favorable to the delivery of raw materials and close to the location of use. The apparatus comprises a substantially complete material handling plant, including storage hoppers, surge hoppers, weight hoppers and elevator structure for raising material from ground level to the appropriate hoppers. Nevertheless, the hoppers may be disassembled, transported and reassembled quickly and easily.

Accordingly, an object of this invention is to provide material handling apparatus having the desirable attributes set forth.

Another object of the invention is that of providing portable material handling apparatus adapted for use in preparing a dry batch of materials by weight and for subsequently discharging such materials by gravity into a utilization device such as a truck mixer, and in which the apparatus is quickly and easily disassembled for transportation from one location to another and thereafter reassembled for use.

Still another object is in the provision of portable material handling apparatus adapted for use in servicing truck mixers and the like, and in which such apparatus includes two material handling machines transportable in a substantially horizontal position and adapted to be elevated into a substantially vertical material handling position in which they cooperate with each other for mutual support.

A further object of the invention is to provide material handling apparatus of the character described having storage, surge and weight hoppers, as well as elevator structures for lifting materials to the appropriate hoppers and which comprises two material handling units separately or jointly transportable from one location to another.

Still a further object is that of providing a portable material handling apparatus of the type described which is sturdy in construction, efficient and reliable in operation, and economical to manufacture.

Further features of the invention pertain to the particular arrangement of the elements of the material handling apparatus whereby the above outlined and additional features thereof are attained.

The invention, both as to its organization and method of operation, together with further objects and advantages thereof, will best be understood by reference to the following specification, taken in connection with the accompanying drawings, in which:

FIGURE 1 is an elevational view of a complete portable material handling apparatus constructed in accordance with the present invention and shown in cooperation with a mobile cement mixer;

FIG. 1A is an enlarged broken side view in elevation of one of the branch chutes shown in FIG. 1;

FIG. 2 is a side elevational view of the cement handling unit of the apparatus of FIG. 1, shown in transporting position and in cooperation with a truck tractor;

FIG. 3 is a side elevational view of the cement handling unit and the aggregate handling unit of FIG. 1 pivotally connected to each other and ready to be raised to operating position;

FIG. 4 is a view similar to FIG. 3 but showing the two units partially raised through use of a jack pole;

FIG. 5 is a view similar to FIGS. 3 and 4 but showing the two units being further raised by block and tackle and winch means, operating on the axles of the two units;

FIG. 6 is a partial elevational view of the same apparatus in fully raised position, showing a bracing platform connecting the two units;

FIG. 7 is a partial end-elevational view of the same apparatus showing two elevators associated with the aggregate handling unit;

FIG. 10 is a diagrammatic, perspective view of weighing beams cooperating with the weighing hoppers of the apparatus.

Figure 9:
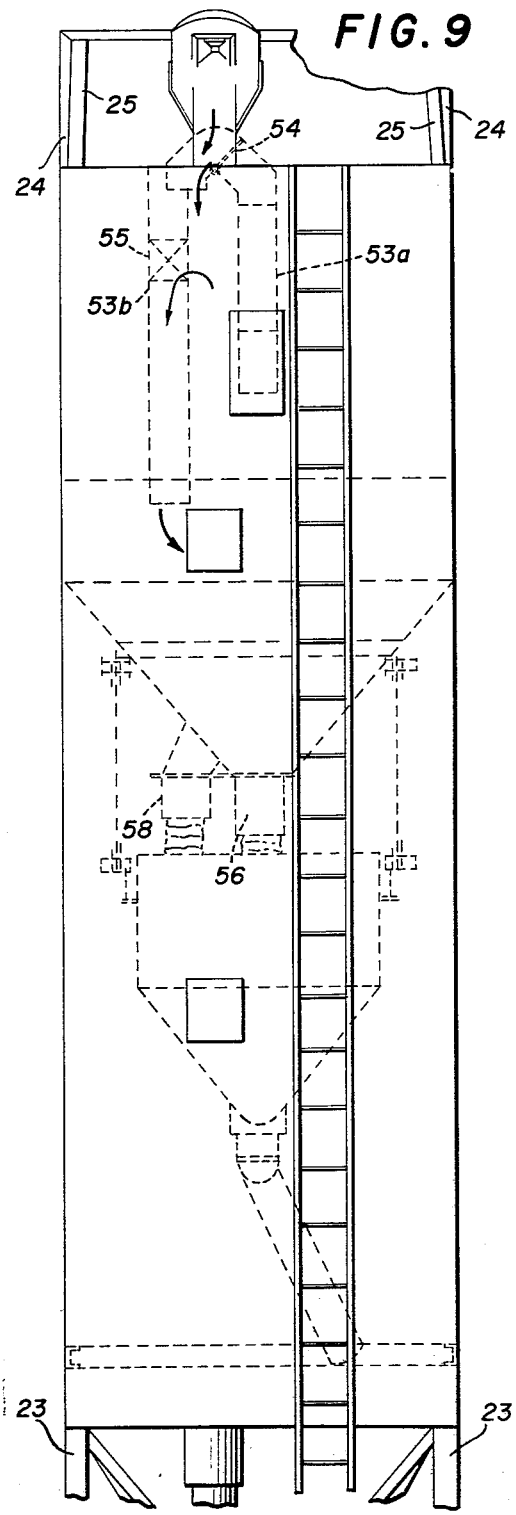
FIG. 9 is an end-elevational view of the cement handling unit.

The illustrated embodiment of the invention includes a cement handling unit 11 and an aggregate handling unit 12, the latter being arranged to handle two grades of aggregate, such as sand and gravel, separately. The cement handling unit 11 includes an overhead storage hopper 13, a weighing hopper 14, a surge hopper 15, an auger type elevator 16 and horizontal auger type conveyor means 17 and 18, the latter being seen in FIG. 6. All of these elements, with the exception of the conveyor 18, are mounted on a framework or chassis which includes frame members 21, 22 and 23, forming a base, and frame members 24 and 25 extending upwardly from the upper or forward end of the chassis proper. As may be seen in FIG. 9, these frame members are provided in pairs, and with suitable cross members. The main body of the unit is preferably enclosed except for a portion of the right hand side thereof, as viewed in FIG. 1. In the interest of economy the walls of the body comprise corresponding walls of the overhead hopper and the surge hopper.

The aggregate handling unit 12 includes two overhead storage hoppers 31 and 32 (see FIG. 8), a single weighing hopper 33, two surge hoppers 34 and 35, and two bucket type elevators 36 and 37 (see FIG. 7). It is intended that the two elevators handle one or more different types of aggregate such as sand and gravel, and that the two overhead storage hoppers and the two surge hoppers also handle one aggregate singly, or two aggregates separately, while the weighing hopper handles one or more aggregates in accumulative fashion. These elements of the aggregate unit are also mounted on a framework or chassis which includes frame members 41, 42 and 43 forming a base, and frame members 44 and 45 extending upwardly from the upper or forward end of the chassis. As in the case of the cement unit, the main body of this unit is preferably enclosed except for a portion of the inner or underside (the left hand side as viewed in FIG. 1). The walls of the body preferably comprise the walls of the surge and storage hoppers. Two ducts 39, one of which is shown in FIG. 1, are provided for the return or downwardly moving sections of the elevators 36 and 37, these ducts extending through the respectively associated storage hoppers.

The two units or machines 11 and 12 are pivotally connected to each other at their extreme inner or upper ends as by a heavy bolt or pin 47, whereby the two units provide mutual support for each other in the raised or upright positions thereof illustrated in FIG. 1. The pivotal connection of the two machines through the pin 47 serves a further purpose as is explained in detail below.

The two machines 11 and 12 in the upright positions thereof are also connected to each other along the center portions thereof by means of a platform 48 which is detachably secured to the two units through suitable bolts and brackets as shown in FIGS. 1 and 6. The platform 48 supports weighing scales, described in greater detail herinafter, and serves as an operating station for an attendant. Preferably, a ladder 48a is provided for convenient access to the platform 48. The two units or machines may also be releasably connected to each other adjacent the upper end portions thereof through suitable lugs 49 and removable pins or bolts 50 in the interest of further rigidifying the structure in its upright position.

The operation of the apparatus with the two units or machines in upright, material handling position will now be described, along with further details of the apparatus. As is shown in FIG. 6, the outer or left hand end of the conveyor 18 is located and arranged to receive cement from a suitable supply source and to convey such cement to the unit 11. Such supply source may be a suitable truck transport or a hopper type rail car, for example, and in the latter instance the outer end of the conveyor will be disposed along a railroad track as illustrated in FIG. 6. The conveyor 18 is driven through the conveyor 17 by an electric motor 51 and a gear box 51a, and is arranged to draw the cement to the lower end of the elevator conveyor 16 (see FIG. 1). The elevator conveyor 16 is driven by a motor 52 through suitable drive connections generally designated by the numeral 52a.

The conveyor 16 raises the cement to the upper end thereof and discharges the cement into a chute 53. The chute 53 has an outlet communicating directly with the hopper 13, as best seen in FIG. 9, and also connects with a branch chute or conduit 53a. A valve or gate 54 mounted within the chute selectively controls the flow of cement to the discharge opening or branch chute 53a. The branch 53a leads through the outer wall of the cement unit and is used in feeding cement into an exterior silo or bin not shown in the drawings. When the valve 54 is in the normal position thereof shown in FIG. 9, cement may fall into the overhead hopper 13 through the discharge opening of the chute 53. However, a branch chute or conduit 53b is also included in the structure and, as is shown most clearly in FIG. 1a, when the hopper 13 is substantially filled, cement may flow through an overflow opening 55 provided in an inner section 53b' of the branch chute and downwardly therethrough and into the surge hopper 15 in the manner illustrated in FIG. 1. The branch chute 53b also has a section 53b" separated from and extending in parallel relation with the section 53b' and serves as a vent for the hopper 15. The gate 54 may be of conventional construction and is preferably remotely operable from the platform 48.

In the preferred embodiment of the invention, the hopper 13 and the hopper 15 have a combined capacity of a little more than 400 barrels, or slightly more than one railroad carload. Accordingly, if the machine 11 is substantially empty a full carload of cement may be taken in and protected from the weather.

At the lower end of the storage hopper 13 are suitable valve means for selectively permitting gravity flow of cement from the hopper and into the weighing hopper 14. Such valve means preferably include a rotary vane feeder 56 driven by a motor 57 which assures smooth flow of cement. An auxiliary, manually operable valve 58 is also provided, as shown in FIG. 9, to permit withdrawal of cement from the storage hopper in the event that the valve 56 should fail.

Cement which is thus released into the weighing hopper 14 is weighed by the scale means 61 which are supported on the platform 48. More specifically, the weighing hopper 14 is hung on weighing beams generally designated 100, and a force proportional to the weight is transmitted through a tension rod or cable 101 to the scale means 61. Since the scale means 61 may be of any conventional form, they are not described in further detail herein. A recommended arrangement of weighing beams is shown in FIG. 10 and is described hereinafter.

It will be appreciated that cement is permitted to flow into the weighing hopper 14 until a desired quantity is contained thereby. The motor 57 and the rotary vane feeder 56 are then stopped. If desired, this may be accomplished automatically through electrical switches actuatable by scale operation, all in a manner well known in the art.

Suitable valve means at the lower end of the weighing hopper may then be operated to permit gravity flow of cement from the weighing hopper, through a chute 65, and into a mobile cement mixer 66 stationed between the two inclined units or machines 11 and 12 and beneath the chute 65. The valve means at the lower end of the weighing hopper preferably include a conventional type of discharge gate 67 and pneumatic operating means 68 therefor. The manual controls for the above described valve means, as well as for the various other valve means and conveyor motors described herein, are preferably arranged for convenient operation by an attendant standing on the platform 48.

Further in connection with the cement unit or machine 11, valve means, which may be in the form of a manually operated rotary plug valve 69, is arranged at the lower end of the hopper 15. When it is desired to draw cement from the surge hopper 15 and deposit it in the storage hopper 13, the feeder 69 is caused to operate and feed cement from the surge hopper to the conveyor 17, the motor 51 driving the conveyor 17. It should be noted that the screw of conveyor 17 is of opposite pitch relative to the screw of conveyor 18 so that cement is moved to the left (FIG. 6) by the conveyor 17 to the lower end of the elevator conveyor 16 and to the right by conveyor 18 to the lower end of conveyor 16. The latter conveyor raises the cement to the hopper 13 in the manner previously described.

Referring now to the details and operation of the aggregate handling unit or machine 12, the two elevator conveyors 36 and 37 are intended to handle two different types of aggregate such as sand and gravel, the two materials being separated by an internal divider wall 71 (see FIG. 7). These elevator means are respectively driven by a pair of electric motors 72, one of which may be seen in FIG. 1 along with suitable drive connections generally designated 72a. Since these elevator means may be conventional bucket type conveyors as shown and which are well known in the art, they are not described in further detail herein.

It is intended that the conveyors 36 and 37 normally discharge the aggregates respectively carried thereby into the separate receiving hoppers 31 and 32. In the interest of greater flexibility and reliability, a flop gate or valve 74 is arranged at the top of the storage hoppers 31 and 32 and immediately below the discharge points of the conveyors 36 and 37. As may be seen best in FIG. 8, the gate 74 is pivotally mounted at the upper end of a dividing wall 75 common to the two hoppers 31 and 32. When the gate 74 is centrally or vertically positioned, the two elevator means respectively discharge the aggregates carried thereby into the separate hoppers. However, if the gate is swung to the left as viewed in FIG. 8, both or either of the elevator means will discharge the aggregates into the right hand hopper 31. Similarly, if the gate 74 is swung to the right, either or both of the elevators will discharge aggregates into the left hand hopper 32. This arrangement protects against disablement of either of the conveyors 36 and 37. It will be apparent that if the elevator 36 should be disabled, the elevator 37 could charge the hopper 32 with sand with the gate 74 in its normal position. Gravel could then be pushed to the lower end of the conveyor 37, whereby the latter would charge the hopper 31 with gravel by proper manipulation of the gate 74.

At the lower ends of the hoppers 31 and 32 are valve means for selectively permitting gravity flow of aggregates from the storage hoppers into the weighing hopper 33. These valve means preferably include gates 76 and pneumatic controls 77 therefor.

Aggregate which is permitted to flow by gravity into the weighing hopper 33 from either of the storage hoppers is weighed by scale means 81 which are supported on the platform 48 immediately below the scale means 61 for the cement unit. The weighing hopper 33 is hung on weighing beams generally designated 100 which may be identical to those of the cement weighing hopper and which are shown in FIG. 10. A force which is proportional to the weight of the aggregate within the weighing hopper 33 is transmitted through a tension rod or cable 102 to the scale means 81. Since the scale means 81 may be of any conventional form, they are not described in detail herein, and preferably, the scale means 81 include selectively operable scale beams for the two forms of aggregate.

When the desired weight of either aggregate has been received by the weighing hopper, as indicated by the scale means 81, suitable valve means at the lower end of the weighing hopper may be operated to permit gravity flow of such aggregate from the weighing hopper, through a chute 85 and into the mobile cement mixer 66. The valve means at the lower end of the weighing hopper 33 preferably include a conventional type of discharge gate 87 and pneumatic controls 88 therefor. The desired amount of the other aggregate is then permitted to flow into the weighing hopper in a similar manner, and is permitted to discharge into the mobile cement mixer. However, it should be noted that the usual practice is to weigh the separate aggregates in an accumulative manner when they comprise a single batch; and in such event, the first aggregate is not discharged from the weighing hopper before the second aggregate is weighed.

As in the case of the cement unit 11, the storage hoppers 31 and 32 are permitted to respectively overflow into the surge hoppers 34 and 35 through separate chutes 89 in the manner illustrated in FIG. 1, only one such chute being shown in the drawings. Valve means are provided at the bottom of the two hoppers 34 and 35, and these valve means may be in the form of conventional pneumatically operated gates 90. When it is desired to draw aggregates from either of the hoppers 34 or 35 and deposit the same in the respectively corresponding hoppers 31 and 32, the corresponding gate 90 is opened and the associated elevator means 36 or 37 actuated to raise the thusly released aggregate.

Figure 8:
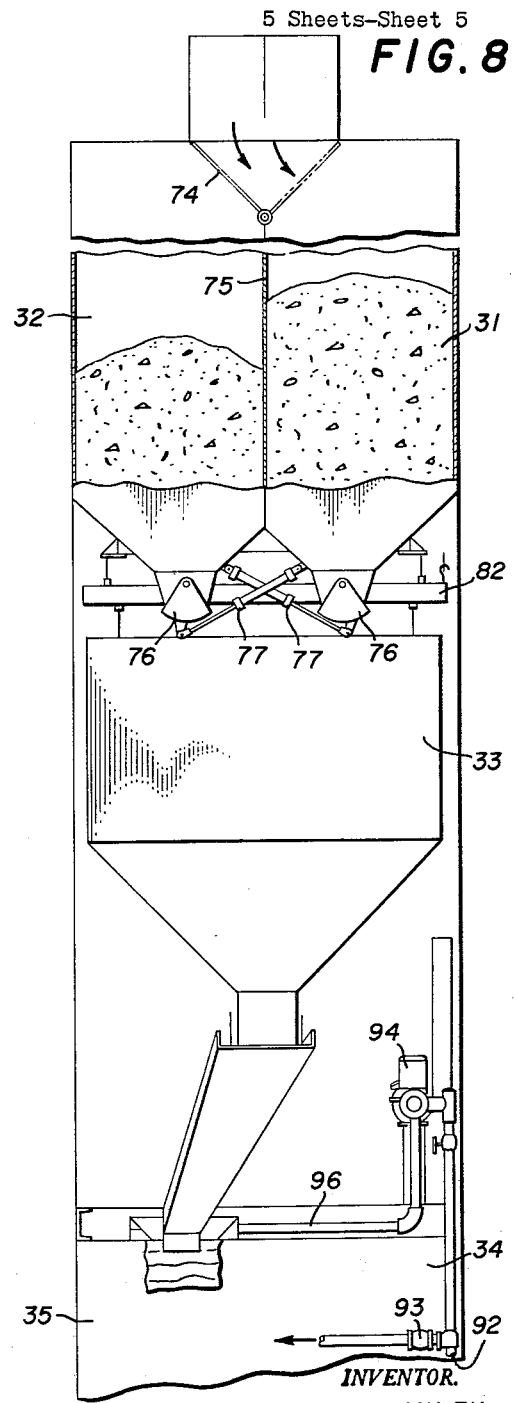
FIG. 8 is a cross-sectional view of the aggregate handling unit taken along the line 8—8 of FIG. 1.

It is desirable that a water supply be available for servicing the mobile cement mixers as well as for incidental purposes. A water main 92 is shown in FIGS. 1 and 8 which is intended for connection to a suitable supply source, and a conduit-equipped outlet 93 is provided for use in washing down equipment and for other miscellaneous purposes. The main 92 leads to a water meter 94, which is located on the platform 48 such that it may be observed by an operator stationed thereon. Water flows from the meter 94 through a valve 95 and pipe 96 to a perforate pipe 97 located adjacent the lower ends of the chutes 65 and 85. Accordingly, water entering a mobile cement mixer shrouds the cement or aggregate flow. The valve 95 and the meter 94 permit the operator to control the water content of the mix in accordance with a prescribed formula.

While various weighing beam arrangements may be suitable for use in connection with the weighing hoppers 14 and 33 and the scale means 61 and 81, an exemplary arrangement is illustrated in FIG. 10 and may be employed with either or both of the weighing hoppers. Such arrangement includes a pair of generally L-shaped beams, each having a base portion 104 and an arm portion 105 extending laterally therefrom. A pair of short arms 106 also extend laterally from each base portion in longitudinally spaced, generally parallel relation with the arms 105.

A suitable pivotal support 107, preferably in the form of a conventional knife edge hanger, supports each of the four arms 106, the supports 107 being hung from fixed frame members of the associated machine through rods 108. Similar pivotal supports 109 connect to the short arms 106 toward the inner free ends thereof, and such supports 109 carry the associated weighing hopper 14 or 33 through rods 110. It will be seen that with this arrangement, the weight of the hopper urges the free ends of the arm portions 105 downwardly.

A pivotal support 111 carries the free inner ends of both arm portions 105 and is connected by an upwardly extending rod 112 to another pivotal support 113. This latter support connects to one end of a beam 114 which is supported by a fixed frame member through another support 115 and a rod 116 extending upwardly therefrom. The rod 101 or 102, extending to the scale means 61 or 81, is connected through still another pivotal support 117 to the other end of the beam 114.

It will now be seen that the associated hopper is supported at four points, its weight causing an upward pull on the rod 101 or 102. By virtue of the leverage provided by the weighing beam arrangement, the tension in the rod 101 or 102 is a small fraction of the hopper weight, but proportional thereto.

Each of the units or machines 11 and 12 is readily transported along a highway by a conventional truck tractor in the manner shown in FIG. 2. More particularly, a pair of wheels 120 are provided for each unit and are rotatably mounted on the respective frame members 21 and 41 such that one end of each unit or machine is rotatably supported when the machine is in substantially horizontal position. At the other end of each machine a king pin or other conventional apparatus (not shown in the drawings) is provided for pivotally connecting the frame members 24 or 44 to the fifth wheel of a truck tractor.

When both units or machines have been transported to the desired working site they are arranged end to end in the manner illustrated in FIG. 3, and the frame members 24 and 44 of the respective machines 11 and 12 are then pivotally connected by the pin 47. If a crane of sufficient reach and capacity is available, the pivotally connected ends of the machines may be raised thereby such that the two machines are brought to their generally vertical, material handling positions illustrated in FIG. 1. A crane block 121 is shown in phantom lines in FIG. 1 to illustrate this method of simultaneously raising the two machines to their working positions.

It is not necessary, however, that such a crane be available to bring the machines to their upwardly oriented working positions for alternative arrangements may be employed as the jack pole and block and tackle means shown in FIG. 4. The jack pole 122 may be employed as illustrated in FIG. 4 and may be of conventional form, employing a rigid pole 123, a pulley wheel 124 and a winch 125. In the application of the invention illustrated in FIG. 4, a concrete foundation 126 has been laid, with heavy reinforced portions 127 arranged to support the lower ends of the machines when the machines reach their generally vertical, working positions. A jack pole of reasonable length may be employed to raise the machines to the positions illustrated in FIG. 4.

Block and tackle means, generally designated 130, are shown in FIG. 4 and are connected between the axles of the two machines. With the two machines raised by the jack pole to an inclined position, and more particularly to a position in which the pivot pin 47 is disposed substantially above the plane of the axles of the wheels 120, the block and tackle means 130 may then be used to draw the axles toward each other and cause the pivotally connected ends of the machines to jack-knife upwardly through the position of FIG. 5 and into the position of FIGS. 1 and 6.

During the raising of the machines to their operating positions by the jack pole and the block and tackle means, it is preferred that the wheels 120 of one of the machines be positively located as by stationary chocks 132 which permits the final positions of the two machines to be determined. In the interest of safety, a drag chock 133 may be employed in association with each of the wheels 120 of the other machine to prevent reverse movement thereof.

With the two machines raised to their working positions, the frame members 22 and 42, which define planes, rest firmly on the level base 126, as shown in FIG. 1. The wheels 120 of both units are so positioned as to provide rotating support for the lower ends of the machines substantially throughout the raising operation and until the frame members 22 and 42 are contiguous with the base. The two units may be firmly secured in their operating positions by installation of the platform 48 and pins 50. The apparatus may then be prepared for operation by attachment of the conveyor 18 to the conveyor 17 and by installing the scales 61 and 81 and the chutes 65 and 85. The apparatus may be disassembled and the two machines lowered to their substantially horizontal positions by reversal of the erecting procedure described above.

It should be noted, as shown best in FIG. 1, that the units 11 and 12 are respectively provided with a relatively large cavity or recess along the inner facing sides thereof and such cavities receive the weighing hoppers and supporting members therefor so that the weighing hoppers are substantially contained within the dimensional limits of the units 11 and 12 and are not carried exteriorly thereof. Consequently, the weighing hoppers need not be removed when the units are transported and a substantial time saving results in that these relatively large hoppers need not be removed and subsequently remounted when the units are transported from one location to another. Since the weighing hoppers are substantially contained within the respective units, they in no way impede or interfere with the transportation of the units. Further, the electrical controls, including the main switch, fused safety switches for the respective motors, magnetic motor starters, transformer for providing interior and exterior lighting, etc. are mounted within the cavity or recess provided by the aggregate unit 12. However, the scale beams 61 and 81 and the chutes 65 and 85 are removed during transportation of the units.

Portable material handling apparatus adapted to service mobile cement mixers has now been described which performs all of the desired functions of such apparatus while being readily disassembled, transported and reassembled. More particularly, the apparatus draws on exterior supplies of the required materials, stores a large quantity of these materials, weighs the materials, and delivers the weighed quantities of materials into mobile cement mixers.

While there has been described what is at present considered to be preferred embodiment of the invention, it will be understood that various modifications may be made therein, and it is intended to cover in the appended claims all such modifications as fall within the true spirit and scope of the invention.

What is claimed is:

1. In transportable material handling apparatus adapted for use in preparing batches of dry materials by weight, a pair of longitudinally extending material handling machines each having structure at one end thereof for supporting the machine on said structure in a first inclined upstanding use position, road wheels mounted on each of said machines at said one end thereof for rotatably supporting each machine on said wheels for movement between said first position and a second generally horizontal transportation position, and for supporting said one end of the machine on said wheels in said second position, means on each of said machines adjacent the other end thereof for independently connecting said machines to a tractor so as to be moved thereby on said wheels from one location to another when in said second position, means adjacent said other end of each of said machines for pivotally interconnecting the ends for rotatably moving the machines together between said second position, and said first position wherein the machines are inclined toward each other and said other ends are uppermost on the machines, and for maintaining in upstanding position each said other end by the other when said machines are in said first position, each of said machines being provided with a material storage compartment therein adjacent said other end and also being equipped with weigh-hopper structure for selectively receiving materials from the associated storage compartment, a pair of conveyor structures respectively carried by said machines for elevating materials to the respectively associated storage compartments when said machines are in said first position, control structures respectively associated with said machines for selectively controlling the flow of materials into said weigh-hopper structures, and a platform oriented in a generally horizontal position between said machines in said first position thereof and being removably connected with said machines, said platform defining an operator's station and being located above the wheel-equipped said one ends of said machines at an elevation sufficient to permit passage of a mobile cement mixer or the like thereunder.

2. In transportable material handling apparatus adapted for use in preparing batches of dry materials by weight, a pair of longitudinally extending material handling machines each having structure at one end thereof for supporting the machine on said structure in a first inclined upstanding use position, road wheels mounted on each of said machines at said one end thereof for rotatably supporting each machine on said wheels for movement between said first position and a second generally horizontal transportation position, and for supporting said one end of the machine on said wheels in said second position, means on each of said machines adjacent the other end thereof for independently connecting said machines to a tractor so as to be moved thereby on said wheels from one location to another when in said second position, means adjacent said other end of each of said machines for pivotally interconnecting the ends for rotatably moving the machines together between said second position, and said first position wherein the machines are inclined toward each other and said other ends are uppermost on the machines, and for maintaining in upstanding position each said other end by the other when said machines are in said first position, a material storage compartment in a first one of said machines adjacent said other end thereof, a conveyor structure carried by said first machine for elevating materials to said storage compartment when said machines are in said first position, a first weigh-hopper structure on said first machine for receiving materials from said storage compartment, a pair of material storage compartments in side-by-side relation in the second one of said machines adjacent said other end thereof, a pair of conveyor structures carried by said second machine and respectively associated with said side-by-side pair of storage compartments for elevating materials thereto when said machines are in said first position, a second weigh-hopper structure on said second machine for receiving materials from each of said side-by-side storage compartments, and control structures respectively associated with said machines for selectively controlling the flow of materials into said weigh-hopper structures.

3. The material handling apparatus of claim 2, including valve structure incorporated in said second machine for selectively controlling the delivery of materials from said pair of conveyor structures associated therewith so as to enable materials to be discharged into one or the other of said side-by-side storage compartments from either of said conveyor structures of said pair.

4. In transportable material handling apparatus adapted for use in preparing batches of dry materials by weight, a pair of longitudinally extending material handling machines each having structure at one end thereof for supporting the machine on said structure in a first inclined upstanding use position, road wheels mounted on each of said machines at said one end thereof for rotatably supporting each machine on said wheels for movement between said first position and a second generally horizontal transportation position, and for supporting said one end of the machine on said wheels in said second position, means on each of said machines adjacent the other end thereof for independently connecting said machines to a tractor so as to be moved thereby on said wheels from one location to another when in said second position, means adjacent said other end of each of said machines for pivotally interconnecting the ends for rotatably moving the machines together between said second position, and said first position wherein the machines are inclined toward each other and said other ends are uppermost on the machines, and for maintaining in upstanding position each said other end by the other when said machines are in said first position, a material storage compartment in a first one of said machines adjacent said other end thereof, a first weigh-hopper structure on said first machine for receiving materials from said storage compartment, a pair of material storage compartments in side-by-side relation in the second one of said machines adjacent said other end thereof, a pair of conveyor structures carried by said second machine and respectively associated with said side-by-side pair of storage compartments for elevating materials thereto when said machines are in said first position, a second weigh-hopper structure on said second machine for receiving materials from each of said side-by-side storage compartments, control structures respectively associated with said machines for selectively controlling the flow of materials into said weigh-hopper structures, said machines being spaced apart adjacent the lower said one ends thereof when in said first use position, a platform extending between said machines in a generally horizontal position when said machines are in said first position thereof, said platform being removably connected with said machines and at an elevation sufficient to permit passage of a mobile cement mixer or the like thereunder and through the space between said machines so as to receive materials from said weigh-hopper structures, and weighing apparatus carried by said platform for connection with said weigh-hopper structures to determine the weight of materials contained therein.

5. The material handling apparatus of claim 4, including valve structure incorporated in said second machine for selectively controlling the delivery of materials from said pair of conveyor structures associated therewith so as to enable materials to be discharged into one or the other of said side-by-side storage compartments from either of said conveyor structures.

References Cited in the file of this patent

UNITED STATES PATENTS

| | | |
|---|---|---|
| 1,304,774 | Humphries | May 27, 1919 |
| 2,310,592 | Noble | Feb. 9, 1943 |
| 2,347,437 | Saxe | Apr. 25, 1944 |
| 2,576,001 | Daniels | Nov. 20, 1951 |
| 2,627,356 | Bell | Feb. 3, 1953 |
| 2,679,322 | Martinson | May 25, 1954 |
| 2,886,189 | Funderburk | May 12, 1959 |

FOREIGN PATENTS

| | | |
|---|---|---|
| 453,980 | Great Britain | Sept. 22, 1936 |